(12) United States Patent
Ponader

(10) Patent No.: US 11,434,163 B2
(45) Date of Patent: Sep. 6, 2022

(54) VARIABLE DIAMETER SEAL FOR OPTICAL PREFORM FURNACE

(71) Applicant: HERAEUS QUARTZ NORTH AMERICA LLC, Buford, GA (US)

(72) Inventor: Carl W. Ponader, Buford, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 190 days.

(21) Appl. No.: 16/767,956

(22) PCT Filed: Dec. 20, 2018

(86) PCT No.: PCT/US2018/066740
§ 371 (c)(1),
(2) Date: May 28, 2020

(87) PCT Pub. No.: WO2019/126461
PCT Pub. Date: Jun. 27, 2019

(65) Prior Publication Data
US 2020/0369553 A1    Nov. 26, 2020

Related U.S. Application Data

(60) Provisional application No. 62/608,266, filed on Dec. 20, 2017.

(51) Int. Cl.
*C03B 37/029* (2006.01)
(52) U.S. Cl.
CPC ........ *C03B 37/029* (2013.01); *C03B 2205/80* (2013.01)
(58) Field of Classification Search
CPC .................................................. C03B 37/029
See application file for complete search history.

(56) References Cited

U.S. PATENT DOCUMENTS 4,030,901 A    6/1977  Kaiser
4,201,746 A *  5/1980  Burd ...................... C30B 13/28
                                                        117/933
(Continued)

FOREIGN PATENT DOCUMENTS

CN    102838275 A    12/2012
CN    103269990 A     8/2013
(Continued)

OTHER PUBLICATIONS

WO2012033158—WIPO Machine Translation—Performed Feb. 25, 2021. (Year: 2021).*
(Continued)

*Primary Examiner* — Lisa L Herring
(74) *Attorney, Agent, or Firm* — Stradley Ronon Stevens & Young, LLP

(57) ABSTRACT

A variable seal for shielding from contaminants both an object to be heated in, and the heating element of, a high-temperature furnace. The seal has a first support ring and a second support ring separated by a distance. One or more components control the distance between the two support rings. A high-temperature fabric cylinder is attached to the support rings, is located where the object enters or exits the furnace, and surrounds at least a portion of the object. A mechanism engages the approximate center of the fabric cylinder to close the fabric cylinder as the one or more components decrease the distance between the two support rings and to open the fabric cylinder as the one or more components increase the distance between the two support rings, whereby the fabric cylinder continuously contacts the circumference of the object regardless of the diameter of the object.

20 Claims, 10 Drawing Sheets

(56) References Cited

U.S. PATENT DOCUMENTS

| | | | |
|---|---|---|---|
| 4,360,499 A * | 11/1982 | Gubitose | C30B 15/30 117/211 |
| 4,477,274 A | 10/1984 | Janssen et al. | |
| 5,100,449 A | 3/1992 | Cornelius et al. | |
| 6,257,628 B1 | 7/2001 | Nijsen | |
| 7,631,519 B2 | 12/2009 | Shiono | |
| 9,676,503 B2 | 6/2017 | Nummela et al. | |
| 2002/0078714 A1 | 6/2002 | Bird et al. | |
| 2002/0088253 A1 | 7/2002 | Roba et al. | |
| 2002/0092328 A1 | 7/2002 | Pedrido et al. | |
| 2004/0089025 A1 | 5/2004 | Kuwahara et al. | |
| 2006/0280578 A1 | 12/2006 | Shiono | |
| 2009/0025431 A1 | 1/2009 | Otosaka | |
| 2009/0038345 A1 | 2/2009 | Otosaka et al. | |
| 2010/0207333 A1 | 8/2010 | Otosaka | |
| 2011/0265522 A1 | 11/2011 | Okada | |
| 2013/0298501 A1 | 11/2013 | Nummela et al. | |
| 2015/0321944 A1 | 11/2015 | Yamazaki et al. | |

FOREIGN PATENT DOCUMENTS

| | | |
|---|---|---|
| CN | 203530137 U | 4/2014 |
| CN | 104445916 A | 3/2015 |
| DE | 4006839 A1 | 9/1991 |
| EP | 1426343 A2 | 6/2004 |
| EP | 2022766 A2 | 2/2009 |
| JP | H02-051440 A | 2/1990 |
| JP | H04-210166 A | 7/1992 |
| JP | H04-231338 A | 8/1992 |
| JP | H08253337 A | 10/1996 |
| JP | H10167751 A | 6/1998 |
| JP | H11-349342 | 12/1999 |
| JP | 2004-142976 A | 5/2004 |
| JP | 2004-142988 A | 5/2004 |
| JP | 2007-070189 A | 3/2007 |
| JP | 2012056815 A | 3/2012 |
| JP | 2012-148923 A | 8/2012 |
| JP | 2016108192 A | 6/2016 |
| KR | 1020070079758 A | 8/2007 |
| WO | 00/68157 A1 | 11/2000 |
| WO | 2004/050572 A1 | 6/2004 |
| WO | 2012/033158 A1 | 3/2012 |
| WO | 2012/053394 A1 | 4/2012 |
| WO | 2014/115849 A1 | 7/2014 |
| WO | 2016/118144 A1 | 7/2016 |

OTHER PUBLICATIONS

Office action dated Jul. 6, 2021 by Japanese Patent Office for counterpart Japanese Patent Application No. 2020-533576 (English translation attached).

International Search Report and Written Opinion dated Mar. 14, 2019 by the European Patent Office for counterpart international patent application No. PCT/US2018/066740.

First Examination Report dated Jun. 29, 2021 by Intellectual Property India for counterpart Indian Patent Application No. 202047024889.

Office action and search report dated Jan. 5, 2022 by the China National Intellectual Property Office for counterpart Chinese patent application No. 201880082032.7 (with English translation).

* cited by examiner

VARIABLE DIAMETER SEAL FOR OPTICAL PREFORM FURNACE

TECHNICAL FIELD

This application relates generally to an apparatus with a seal and, more particularly, to a seal for a heating furnace and, most particularly, to a seal for an apparatus used to heat a glass preform and draw an optical fiber.

BACKGROUND

Technology is replete with devices that form seals. Known devices also provide a seal around a cylinder of glass where it enters or exits a high-temperature oven. A subset of such devices form seals around a glass cylinder which is being processed in a furnace to create an optical fiber preform.

Optical fibers are produced by the following process. First, an optical fiber preform made of silica glass or another material is fed into a drawing apparatus. One end of the optical fiber preform is heated and softened in the drawing furnace. The softened end is drawn to reduce the diameter. The drawing furnace is provided with a tube and a heater, which are made of carbon in many cases. In this case, these members must be protected from oxidation by using an inert gas as the atmospheric gas in the furnace. In addition, the surface of the optical fiber preform must be maintained clean during the drawing operation in order to secure longitudinal uniformity of the drawn optical fiber. To meet these two requirements, the drawing furnace is structured so as not to make contact with the optical fiber preform, and the space between the tube and the optical fiber preform is filled with an inert gas so that the oxidation of the tube and the heater is minimized if not prevented. Seals maintain the inert atmosphere.

Some seals only operate for a particular fixed-diameter cylinder (e.g., DE4006839 and US2002/0078714). Further seals will work with cylinders having only a small range of diameters (e.g., JPH08253337, JPH10167751, and U.S. Pat. No. 6,257,628). Still further seals have complex components. Such complex seals are disclosed, for example, in EP1426343A2 (the seal is an iris-type shutter), US2006/0280578 (a seal ring includes an inner ring made of multiple graphite sections and an outer ring made of ceramic sections, and the seal ring is pressed against the fiber preform by a coil spring), and U.S. Pat. No. 9,676,503 (the seal uses a multitude of sealing elements which are arranged in one or multiple layers).

SUMMARY

To solve the problems inherent in conventional seals, a variable diameter seal is provided. A first object of the seal is to provide a tight seal around a cylinder having a non-constant or varying diameter; many glass cylinders that can be processed to create an optical fiber preform do not have constant cross-sectional shapes. A second object is to accommodate cylinders of significantly different diameters. A third object is to conform efficiently to the shape of the glass cylinder to be sealed, without damage that might be caused by excessive contact forces between the seal and the surface of the glass cylinder. A fourth object is to achieve the highest quality and efficient seal with a relatively simple structure. A fifth object is to minimize the clearance or gap between the seal and the glass cylinder encompassed by the seal.

A further object is to seal an inert gas atmosphere in a heating furnace, regardless of the diameter variation of the preform heated in the furnace. A still further object is to heat a preform or other glass cylinder in a furnace or heating zone while avoiding contamination of the preform. If the furnace or heating zone is insufficiently sealed against the outside environment, the outside atmosphere flows into the furnace or heating zone and between the seal and cylinder via the chimney effect, risking contamination of the cylinder both by particles and by atmospheric gases such as oxygen and nitrogen (collectively, contaminants). Therefore, yet a further object is to prevent contact by atmospheric gases with the cylinder to be sealed.

Another object is to avoid degradation of the furnace or heating zone itself. Related objects are to improve the efficiency, and to increase the operational life, of the furnace or heating zone. It is still another object to provide an inherently clean process that completely seals the preform assembly so its interface is shielded from the outside environment, particularly from the contaminants inside the heating element (e.g., furnace) of the apparatus. Other related objects are to avoid lateral or transverse forces on the preform during the manufacturing process, and to minimize or eliminate preform bow. An additional object is to achieve nearly 100% finished preform yield.

To achieve the above objects, there is provided a variable seal for shielding from contaminants both an object to be heated in, and the heating element of, a high-temperature furnace. The seal has a first support ring and a second support ring separated by a distance. One or more components control the distance between the two support rings. A high-temperature fabric cylinder is attached to the support rings, is located where the object enters or exits the furnace, and surrounds at least a portion of the object. A mechanism engages the approximate center of the fabric cylinder to close the fabric cylinder as the one or more components decrease the distance between the two support rings and to open the fabric cylinder as the one or more components increase the distance between the two support rings, whereby the fabric cylinder continuously contacts the circumference of the object regardless of the diameter of the object.

Further provided is a system for creating a glass preform from a glass body having a circumference and a diameter. The system includes an apparatus defining a first opening to receive the glass body, a second opening from which the glass preform exits, and a heating zone having a heating element to heat the glass body. The system also includes a variable seal for shielding from contaminants both the glass body and the heating element. The seal has a first support ring and a second support ring separated by a distance. One or more components control the distance between the two support rings. A high-temperature fabric cylinder is attached to the support rings, is located proximate the first opening, the second opening, or both openings of the apparatus, and surrounds at least a portion of the glass body. A mechanism engages the approximate center of the fabric cylinder to close the fabric cylinder as the one or more components decrease the distance between the two support rings and to open the fabric cylinder as the one or more components increase the distance between the two support rings, whereby the fabric cylinder continuously contacts the circumference of the glass body regardless of the diameter of the glass body.

Still further provided is a process for shielding from contaminants both an object having a circumference and a diameter to be heated in, and the heating element of, a high-temperature furnace where the object enters or exits the furnace. The process includes the following steps: (a) providing a variable seal having a first support ring, a second support ring separated from the first support ring by a distance, a high-temperature fabric cylinder having a center and being attached to the first support ring and to the second support ring, and a mechanism engaging the approximate center of the fabric cylinder; (b) locating the variable seal where the object enters or exits the furnace and so that the variable seal surrounds at least a portion of the object; (c) controlling the distance between the first support ring and the second support ring; and (d) assuring that the fabric cylinder continuously contacts the circumference of the object regardless of the diameter of the object by moving the first support ring and the second support ring together to enable the mechanism to tighten the fabric cylinder and moving the first support ring and the second support ring apart to enable the mechanism to loosen the fabric cylinder.

It is to be understood that both the foregoing general description and the following detailed description are exemplary, but are not restrictive, of the invention.

BRIEF DESCRIPTION OF DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
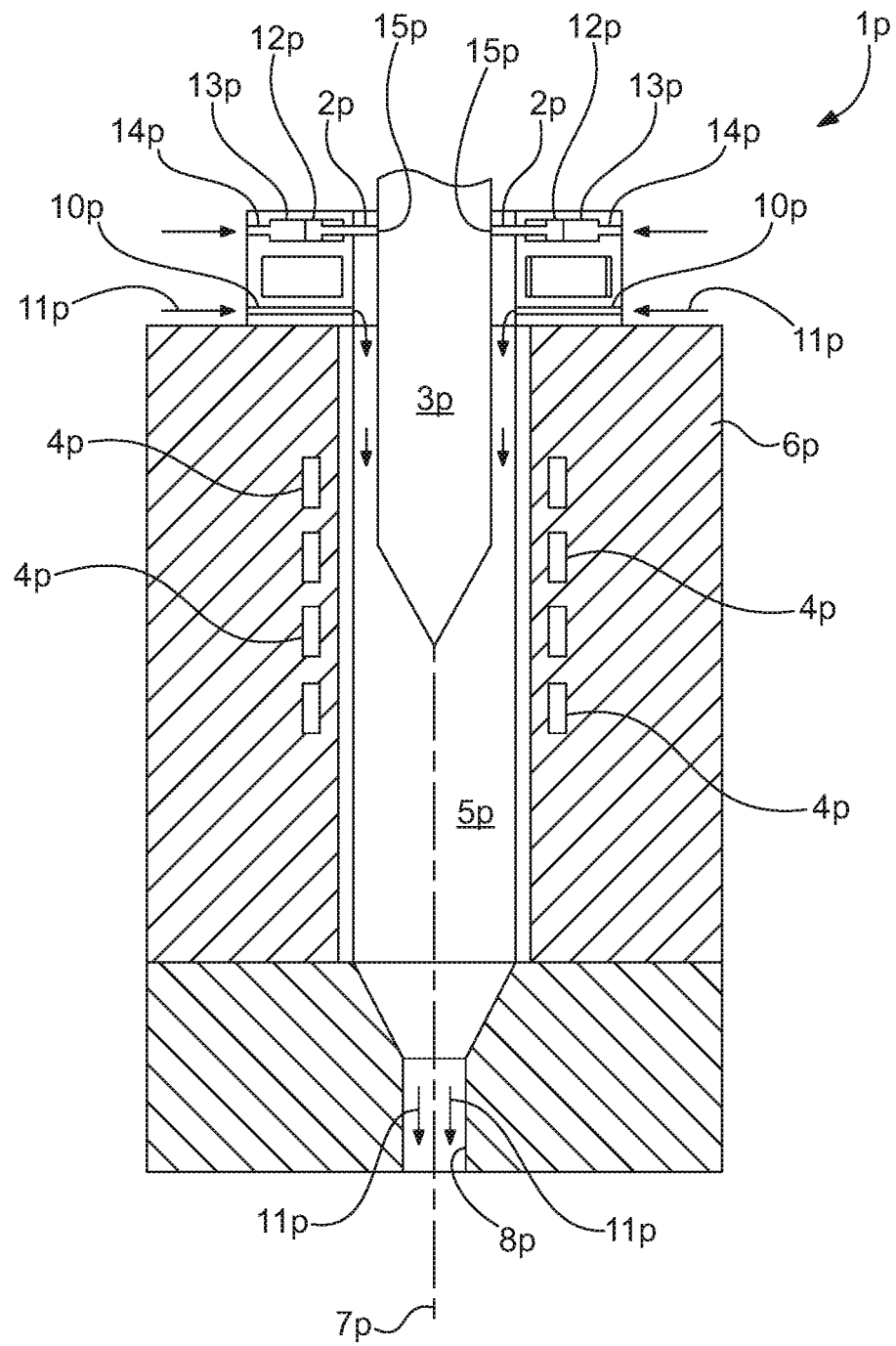
FIG. 1 illustrates a conventional downward draw apparatus.

The field of applied science and engineering concerned with the design and application of optical fibers is known as fiber optics. An optical fiber is a flexible, transparent fiber made by drawing glass (silica) down to a diameter slightly thicker than that of a human hair. Optical fibers are used most often to transmit light between the two ends of the fiber and are used widely in fiber-optic communications, where they permit transmission over longer distances and at higher bandwidths (data rates) than wire cables. Fibers are used instead of metal wires because signals travel along fibers at high capacity with reduced loss. In addition, fibers are also immune to electromagnetic interference, a problem that plagues metal wires. Fibers are also used for illumination, and are wrapped in bundles so that they may be used to carry images, thus allowing viewing in confined spaces, as in the case of a fiberscope. Specially designed fibers are also used for a variety of other applications, such as fiber optic sensors and fiber lasers.

Optical fibers typically include a transparent core surrounded by a transparent cladding material with a lower index of refraction. Light is kept in the core by the phenomenon of total internal reflection which causes the fiber to act as a waveguide. Fibers that support many propagation paths or transverse modes are called multimode fibers; those that support a single mode are called single-mode fibers.

An optical fiber is generally fabricated in two, separate processes. First, a core rod is prepared and then a preform is fabricated by a rod-in-tube (RIT) or rod-in-cylinder (MC) process, or by another overclad process such as an outside vapor deposition (OVD) process. Second, the fabricated preform is heated inside a furnace and drawn into optical fiber. A conventional process and apparatus for producing the optical fiber preforms, completing the first of the two processes, may include the provision of an optical fiber RIT overclad apparatus.

The overclad apparatus includes a vertical lathe, a chuck installed in each end of the vertical lathe, a carriage in the vertical lathe for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe for controlling the vertical movement of the carriage, the flow rate of the oxygen-hydrogen burner, and the rotation of the chucks. The furnace preheats or heats a glass tube to overclad a core rod with the glass tube.

In practice, the outside diameter of the preform is limited to 90 mm or less in the conventional RIT overclad apparatus. That limitation is imposed by inefficient heating by the oxygen-hydrogen burner. Furthermore, a handle must be welded to a single core rod (of the same length as the RIT overclad tube) in order to provide a separate support for the core rod weight from the top end. This results in two disadvantages: (1) waste of core rod material because short core rods cannot be used effectively; and (2) welding of the handle to the core rod, especially with an oxygen-hydrogen torch, results in surface hydroxide (OH) incorporation on the surface of the core rod which if not etched away (an additional cost for the process) can increase fiber attenuation particularly at 1,383 nm due to OH absorption.

More recently, preforms for quartz glass tubing, rods, or collapsed offline rod-in-cylinders (ORICs) have been produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or an upward force depending on the forming zone temperature or viscosity and the weight of the strand supported by the wheels. Forming is accomplished without the aid of a die. Thus, the strand dimensions are controlled by the feed rate of the quartz glass component, the temperature of the heating zone, and the speed of the pulling wheels.

With the conventional ORIC process, a cylinder (typically 3 m long with an outside diameter of about 200 mm) made of synthetic, high-purity glass is collapsed onto a high-purity glass core rod to form an optical fiber preform with heat and vacuum at the interface gap. The preform is usually drawn downward continuously with a diameter significantly smaller than the original diameter of the cylinder. Sufficient vacuum must be applied to the gap between the cylinder and core rod to facilitate interface collapse as well as to support the weight of the core rod through the softened glass. Vacuum is essential to prevent core rod movement with respect to the cylinder; otherwise, the clad-to-core ratio of the resulting preforms will be distorted and fibers drawn from them will fail to meet the required waveguide specifications (such as the cut-off wavelength). Complicated and expensive preform outside diameter measurements and feedback controls are also needed in the downward collapse, stretch, and draw process and, even with such controls, it is difficult to achieve precise preform geometry (including low preform bow or curvature and diameter variation) and waveguide properties free of clad-to-core distortions. This inherent waveguide distortion effect in the downward draw process is in large part due to the gravitational and vacuum forces acting on the molten glass and the un-attached core rod in the furnace where the outer cladding glass, being hotter, flows downward faster than the inner core rod glass.

FIG. 1 illustrates a conventional downward draw apparatus $1p$ as disclosed in U.S. Pat. No. 9,676,503. The apparatus has a plurality of sealing elements $2p$ arranged generally in a ring configuration around a center opening. An elongated, cylindrical, glass preform $3p$ protrudes into the center opening. The glass preform $3p$ is heated by heating elements $4p$ arranged around a vertical center hole $5p$ in a furnace $6p$. In such a furnace $6p$ for heating the glass preform $3p$, the glass preform $3p$ is heated until an optical fiber $7p$ can be drawn from the lower end of the glass preform $3p$.

In order to enhance the properties of the optical fiber $7p$, it is necessary to ensure that the interior of the furnace $6p$ is sealed from the environment during drawing of the optical fiber $7p$. The lower opening $8p$ of the furnace $6p$ is sealed by using an inert gas $11p$. The inert gas $11p$ is fed into the furnace $6p$ via gas inlets $10p$ arranged at various locations about the apparatus $1p$. The sealing elements $2p$ direct most of the introduced inert gas $11p$ to flow downwards such that air, for instance, located in the environment of the furnace $6p$ is prevented from flowing into the furnace $6p$ via the lower opening $8p$ because the inert gas $11p$ is flowing out of the furnace $6p$ via this lower opening $8p$. Alternatively, it is also possible to have a flow upwards through the center hole $5p$ of the furnace $6p$. In that case, one alternative is to introduce the inert gas $11p$ into the center hole $5p$ at a position much lower than illustrated in FIG. 1, and the gas inlet $10p$ in the upper part of the furnace $6p$ is not absolutely necessary.

The sealing elements $2p$ are shaped as elongated plates with a section $12p$ protruding into a chamber $13p$. At least the sealing surfaces $15p$ of the sealing elements $2p$ may be manufactured of glass or graphite, for instance. Depending on the implementation, each sealing element $2p$ may have a chamber $13p$ of its own or, alternatively, sections $12p$ of more than one sealing element $2p$ may protrude into a single chamber $13p$. A fluid is introduced into the chamber $13p$ or chambers $13p$ via an inlet $14p$. One alternative is to use the same inert gas $11p$ as that introduced via other inlets $10p$ into the interior of the furnace $6p$. In any case, the fluid introduced into the chamber $13p$ or chambers $13p$ generates an overpressure in the chamber $13p$ or chambers $13p$. Therefore, the pressure acting on the sections $12p$ of the sealing elements $2p$ in the chambers $13p$ is higher than the pressure at the center hole $5p$ around which the sealing elements $2p$ are arranged. Consequently, the overpressure presses and moves the sealing elements $2p$ towards the center hole $5p$ such that, in the example of FIG. 1, the sealing surface $15p$ of each sealing element $2p$ comes into contact with the glass preform $3p$.

The use of a plurality of sealing elements $2p$ which can be separately moved makes it possible to obtain efficient sealing around the glass preform $3p$, as each sealing element $2p$ may be moved separately from the other sealing elements $2p$ into an exactly optimal position. Therefore, efficient sealing is achieved along the entire outer surface of the glass preform $3p$. If, for some reason, the glass preform $3p$ does not have a perfectly circular cross section, for instance, this does not influence the sealing efficiency. In addition, possible variations in the diameter can also be compensated for, as in the case of a glass preform $3p$ with a smaller or larger diameter, when the sealing elements $2p$ are allowed to move independently of each other to an optimal position. Adjustment of the fluid pressure can be used to increase or decrease the overpressure in the chambers $13p$ such that the force by which the sealing surfaces $15p$ of the sealing elements $2p$ are pressed against the outer surface of the glass preform $3p$ can be adjusted. By such an adjustment, a suitable contact force between the sealing elements $2p$ and the glass preform $3p$ can be achieved, which ensures that the surface of the glass preform $3p$ is not damaged by the sealing elements $2p$.

There is a significant difficulty in producing the largest preforms with outside diameters close to the original cylinder or cladding size with the conventional downward draw systems and processes. A significant amount of good preform glass is wasted at the start-up and at the end of the process where the geometry and waveguide properties of the preform are far from required specifications in terms of such parameters as geometry, clad-to-core ratio, core eccentricity, and bow. Thus, the conventional preform systems and processes have distinct drawbacks.

Figure 2:
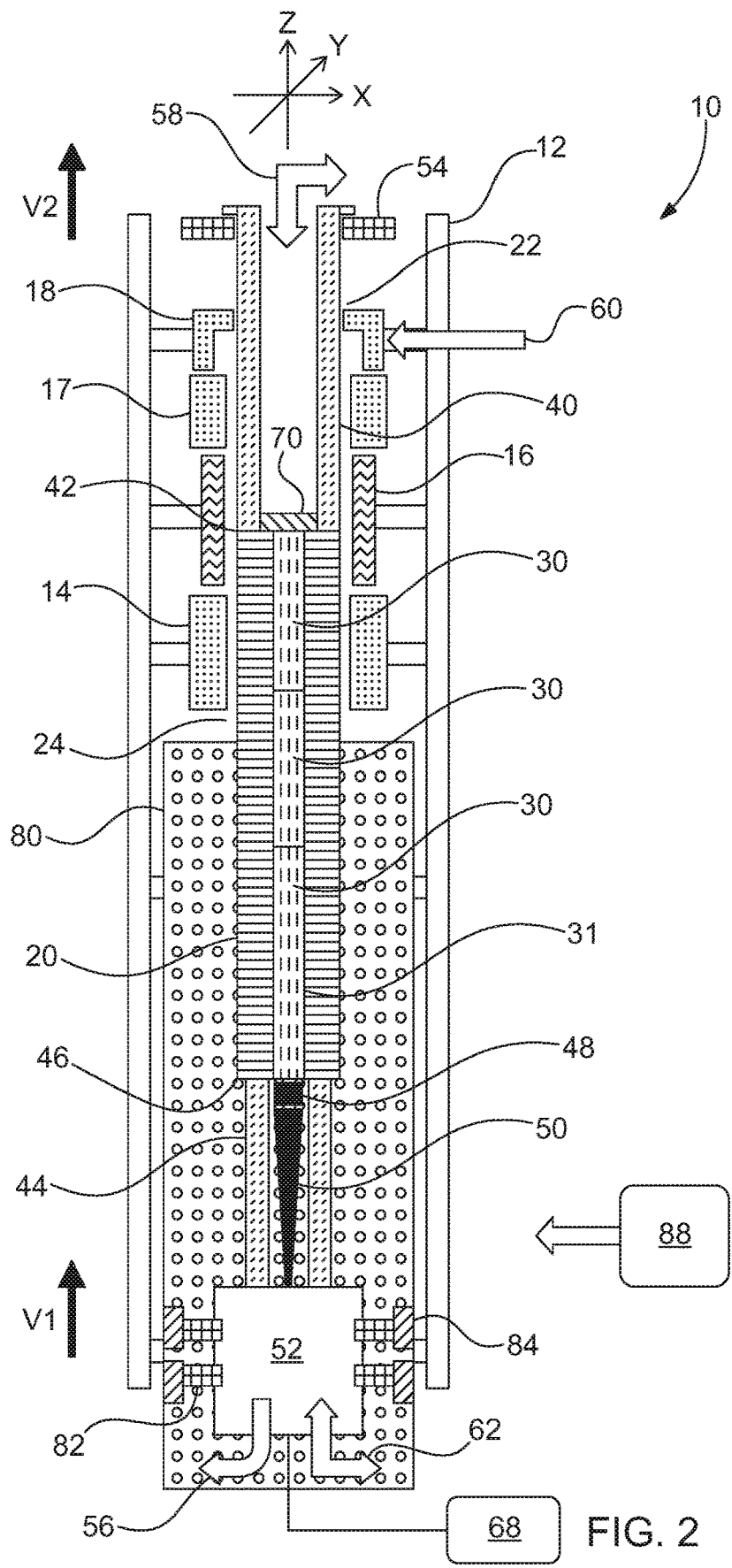
FIG. 2 is a schematic illustrating the main components of the apparatus used in the upward collapse process of forming an elongated component of glass.

According to the embodiments of the invention, an apparatus and upward collapse process are provided that yield a preform with the largest outside diameter and length known to exist (namely, an outside diameter of about 200 mm, where conventional outside diameters are limited to about 150 mm, and a length of about 3 m, or about the same size as the original cylinder or cladding) with almost no waveguide (clad-to-core) distortion and at significantly reduced waste and cost. Conventional optical fiber preforms have an outer diameter of 90 to 150 mm. In the streamlined upward collapse process, the stacked core rods in the ORIC cladding are supported from below (so the core rods do not move relative to the cladding in the collapse process) and the whole ORIC assembly moves up with respect to the furnace so the preform is continuously collapsed and drawn upward as illustrated in FIG. 2 and described below. The apparatus and upward collapse process: (1) produce the largest known preform because they can be made in a collapse-only process with the largest known overclad cylinder, (2) reduce cost because of nearly 100% overclad and finished (tipped)

preform yield (nearly no waste) and a streamlined and simplified (e.g., no on-line measurement or feedback controls) process including an integrated online preform tipping process (a saving of processing time and a heating step), (3) improve waveguide quality because of the inherently low waveguide (clad-to-core) distortion with fixed, stacked, and supported core rods of variable and arbitrary lengths, and (4) allow reactive gas (such as $SF_6$) to be applied to the interface up to about one atmosphere (i.e., no need for vacuum) for improved interface and lower core rod D/d ratio (interface closer to the waveguide core).

The D/d ratio for the core rod is the ratio of the outside diameter of the core rod to the diameter of the waveguide core (where light propagates), where "D" is the outside diameter of the core rod and "d" is the diameter of the waveguide core. The ratio is very important to those who use MT or MC preforms to produce optical fibers in defining core capacity expansion. As the D/d ratio of the core rod decreases, the interface gets closer to the waveguide core and this means the relative amount of glass needed in the core rod decreases (while the amount of glass in the cladding needs to increase). This in turn means that with the same core rod manufacturing facility its capacity for making core rod (or equivalent capacity for optical fiber core) scales roughly as the square of D/d (e.g., a doubling of core capacity by reducing the D/d from 3.3 to 2.3). Reducing core rod D/d presents a significant challenge, however, to the overclad material purity and interface quality because of the exponentially increasing optical power propagation there. Thus, a more aggressive gas etching, cleaning, and drying process at the interface (with $SF_6$ for example) would be needed at lower core rod D/d. In short, a lower D/d ratio (i.e., the interface is closer to the core) allows manufacturers of the preform to (a) expand core capacity easily without expensive investment, and (b) realize more complex and advanced optical fiber designs with refractive index features closer to the core.

Referring to FIG. 2, there is shown an apparatus 10 for producing an optical fiber preform. The apparatus 10 includes a vertically arranged frame 12. From bottom to top, the frame 12 has a lower open end; a pre-heating or lower insulation zone 14; a heating zone 16; a post-heating or upper insulation zone 17; a post-heating cooling, annealing, and oven gas purging zone 18; and an upper open end opposing the lower open end. The heating zone 16 can preferably be heated to temperatures of 500° C. to 2,300° C., and more preferably 1,000° C. to 2,300° C., and still most preferably 1,500° C. to 2,300° C., by a heating element (typically an oven or furnace). More particularly, the heating element is preferably of an annular configuration. The heating element is preferably positioned within or around the frame 12 so as to form the heating zone 16 of the frame 12. An inert gas is injected into the heating element at a high temperature to prevent oxidation of the heating element.

Figure 3:
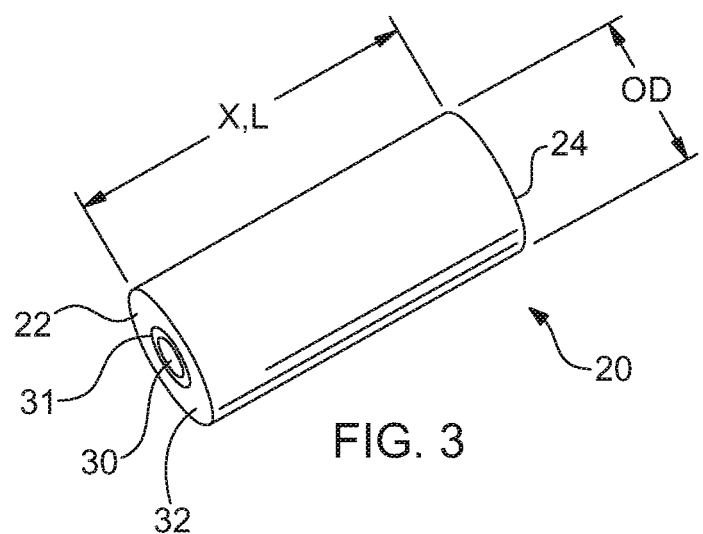
FIG. 3 is a perspective side view of a glass body used to produce an optical component in accordance with an embodiment of the invention.

Referring to FIG. 3, a glass body 20 is used to produce optical fiber preforms. The glass body 20 is of a cylindrical or tubular configuration. The glass body 20 has a length L which extends from a first or upper end 22 to an opposing second or lower end 24. A longitudinal axis X extends between the opposing first and second ends 22, 24. Preferably, both the first and second ends 22, 24 of the glass body 20 are square cut ends.

The glass body 20 is preferably comprised of a glass core or core rod 30 containing the waveguiding optical fiber core and a glass cladding 32 surrounding the core rod 30. More particularly, the core rod 30 is preferably formed in the geometric center of the glass body 20 and extends along the length L of the glass body 20. The cladding 32 is preferably formed over the core rod 30 to radially surround the core rod 30 along the length L of the glass body 20. The cladding 32 surrounds the core rod 30 in a coaxial arrangement aligned along a common center line. A gap 31 exists initially between the core rod 30 and the cladding 32. The cladding 32 has an outside diameter "OD."

The cladding 32 may be pure quartz glass or a doped quartz glass. Preferably, however, the cladding 32 is high purity un-doped or doped quartz glass. The core rod 30 is preferably a mostly high purity quartz glass with doped and un-doped regions to achieve the appropriate refractive index profile. The cladding 32 and the core rod 30 may each be formed by any suitable process, such as fused quartz or one or more types of chemical vapor deposition (CVD), including inside vapor deposition, outside vapor deposition, and vapor axial deposition. The core material at the center of the core rod 30 typically has a refractive index which is greater than the refractive index of the material in the surrounding cladding 32 to enable internal reflection of light signals passing through a fiber drawn from the preform, resulting in an effective waveguide.

Returning to FIG. 2, a first or top collar 40 is affixed to the top of the cladding 32. Although other mechanisms can be used to affix the top collar 40 to the cladding 32, a top weld 42 is suitable. The outside diameter of the top collar 40 is approximately the same as or smaller than the outside diameter of the cladding 32. A second or bottom collar 44 is affixed to the bottom of the cladding 32. Although other mechanisms can be used to affix the bottom collar 44 to the cladding 32, a bottom weld 46 is suitable. The outside diameter of the bottom collar 44 is either smaller than or approximately the same as the outside diameter of the cladding 32. The top collar 40 and the bottom collar 44 are both hollow, ring-like components.

The stacked core rods 30 are positioned inside the cladding 32 and rest on top of a short spacer 48 which, in turn, rests on top of a long spacer 50. The short spacer 48 is provided on top of the long spacer 50 to make sure the long spacer 50 is not welded to the preform after the upward collapse process and can then be removed easily from the bottom collar 44. The long spacer 50 is supported by a bottom collar holder and vacuum unit 52 located below the long spacer 50. The bottom collar holder and vacuum unit 52 also holds, as its name implies, and supports the bottom collar 44. The preform assembly (which includes the stacked core rods 30 and the cladding 32 of the glass body 20, along with the top collar 40 and the bottom collar 44 affixed to the cladding 32) and the bottom collar holder and vacuum unit 52 are loaded first onto a top collar holder and vacuum unit 54 located above the oven gas purging zone 18. (The bottom collar holder and vacuum unit 52 and the top collar holder and vacuum unit 54 allow the apparatus 10 to either remove gas from, i.e., create a vacuum, or introduce gas to the apparatus 10 at either end of the apparatus 10. The top collar holder and vacuum unit 54 holds, as its name implies, and supports the top collar 40.) Then the glass body 20 is positioned with respect to the heating zone 16 and, more particularly, to the heating element of the heating zone 16 and moved upwardly through the heating element. The bottom collar holder and vacuum unit 52 is gripped and supported below the heating zone 16; the top collar holder and vacuum unit 54 is gripped and supported above the heating zone 16. Before the heating step starts, the top weld 42 (and, therefore, the top of the cladding 32) is initially placed a predetermined distance below the center of the heating element to avoid thermal shock to the top weld 42.

(By "predetermined" is meant determined beforehand, so that the predetermined characteristic must be determined, i.e., chosen or at least known, in advance of some event.) For example, this distance may be about 350 mm.

The upward collapse process of manufacturing a preform using the apparatus 10 is explained with reference to FIG. 2. The glass body 20 is passed through the frame 12, where it is heated, softened, and elongated to form an optical component, such as an optical fiber preform. More particularly, the lower end 24 of the glass body 20 is preferably positioned in a stable manner in the frame 12 at the start of the process and the glass body 20 then progresses in an upward (i.e., opposite the conventional downward) direction through the frame 12. In the frame 12, the glass body 20 is heated in a zone-wise manner in the heating zone 16. The bottom collar holder and vacuum unit 52 located at the bottom of the apparatus 10 moves at a velocity V1, while the top collar holder and vacuum unit 54 located at the top of the apparatus 10 moves at a velocity V2. A preform is continuously created by melt deformation to collapse the overclad gap 31 and fuse the core rods 30 to the overclad cylinder or cladding 32 (and optionally the preform can be stretched/elongated or shortened/compressed by either pulling or compressing forces applied by the top collar holder and vacuum unit 54 and the bottom collar holder and vacuum unit 52 during the process).

In one embodiment, the glass body 20 is a coaxial assembly of two separate glass components: the stacked core rods 30 and the cladding 32. More particularly, the core rods 30 are in the form of a solid, cylindrical rod and the cladding 32 is in the form of a hollow overclad cylinder surrounding the stacked core rods 30 (i.e., a rod-in-cylinder assembly). In the coaxial assembly, the stacked core rods 30 and the cladding 32 are not fused together before the glass assembly enters the heating zone 16.

As the coaxial assembly of this embodiment of the glass body 20 progresses upward through the frame 12, the core rods 30 and the cladding 32 are heated to a predetermined temperature and time sufficient to cause the two glass components to soften and fuse together to form an integral and consolidated glass body 20. (By "integral" is meant a single piece or a single unitary part that is complete by itself without additional pieces, i.e., the part is of one monolithic piece formed as a unit with another part.) More particularly, as successive portions of the two-piece glass body 20 approach the heating zone 16 and are heated in the heating zone 16, the cladding 32 and the core rods 30 become softened and the softened cladding 32 collapses on and fuses with the core rods 30. At least one, and more preferably a plurality of "ready-to-draw" preforms may then be drawn directly into fiber from the resulting monolithic glass body 20.

Preferably, the coaxial arrangement of this embodiment of the glass body 20 is heated to temperatures of 500° C. to 2,300° C., and more preferably 1,000° C. to 2,300° C., and most preferably 1,500° C.-2,300° C. More preferably, softening and collapsing of the cladding 32 on the core rod 30 occurs at a temperature of 1,000° C. to 2,200° C., and more preferably 1,300° C. to 2,000° C., and most preferably 1,600° C. to 1,800° C. Fusing together of the softened and collapsed cladding 32 with the softened core rod 30 preferably occurs at a temperature of 1,000° C. to 2,200° C., and more preferably 1,300° C. to 2,200° C., and most preferably 1,600° C. to 2,200° C. Those skilled in the art will understand, however, that other factors, such as glass material composition and throughput also affect the temperature at which the cladding 32 will collapse on and fuse with the core rods 30.

The fused interface between the core rods 30 and the cladding 32 is assured to be clean by several components of the apparatus 10. For example, the bottom collar holder and vacuum unit 52 and the top collar holder and vacuum unit 54, which are both sealed, permit the upward collapse process to operate in a vacuum. The bottom collar holder and vacuum unit 52 and the top collar holder and vacuum unit 54 also isolate the preform assembly (particularly the interface) from potential contaminants in the heating element (e.g., furnace) and the outside environment. The furnace and the outside environment are typical sources of contamination for conventional processes, especially during the vacuum initiation process where the ingress of contaminants into the interface is difficult to avoid. In addition, a reactive interface treatment gas can be used to etch, clean, and dry the interface.

When the top weld 42 is above the center of the heating zone 16, the vacuum pump of the bottom collar holder and vacuum unit 52 is activated (i.e., turned on). Such activation draws a vacuum in the direction of arrow 56 and causes the pressure in the top collar 40 to start decreasing. When the pressure in the top collar 40 stops decreasing, the top of the cladding 32 will have collapsed, the gap 31 will have closed, and the cladding 32 will have sealed or fused with the core rod 30. At this moment, the vacuum keeps pumping at the bottom collar holder and vacuum unit 52 while back filling gas (e.g., nitrogen gas $N_2$) to the top collar 40 until the pressure reaches about 1 atm. Then the top collar 40 is connected to air.

The vacuum pump of the top collar holder and vacuum unit 54 can be activated (i.e., turned on) to draw a vacuum in the direction of arrow 58. Similarly, a purging of the gas (typically an inert gas such as argon, helium, or, most typically, nitrogen) used in the heating element of the heating zone 16 can be achieved by introducing gas into the heating element in the direction of arrow 60. The gas purging occurs between the outer surface of the glass body 20 and the surface of the heating element, to prevent soot generation on the outer surface of the glass body 20 and oxidization of the heating element. The gas purging at the top of the heating element is typically on from the beginning of the process. It is important to identify a proper purging rate (9 m³/h, for example) so that no soot or other deposits are formed on the surface of the preform during or after the process.

The upward collapse process also allows a partial pressure in the gap 31 between the core rods 30 and cladding 32 (up to atmospheric pressure or a little more, typically about 1,100 mbar) because there is no need for vacuum to support the weight of the core rods 30. Therefore, a reactive interface treatment gas such as sulfur hexaflouride ($SF_6$, which is safe to handle at room temperature) can be freely applied during the high-temperature collapse in the direction of interface treatment gas arrow 62 to etch away any potential interface contamination such as metallic particles or surface hydroxide (OH). In addition to sulfur hexaflouride, other suitable reactive interface treatment gases include oxygen ($O_2$), chlorine ($Cl_2$) although safety concerns would arise, fluorine ($F_2$), nitrogen trifluoride ($NF_3$), silicon tetrafluoride ($SiF_4$), carbon tetrafluoride ($CF_4$), and fluoroform ($CHF_3$). Use of a reactive interface treatment gas to etch, clean, and dry the preform interface yields an improved interface, an enhanced optical fiber quality (reduced fiber breaks, bubbles, loss, or airlines), and a lower core rod D/d ratio.

Returning again to FIG. 2, the apparatus 10 may optionally include a gripper system 80 attached to the frame 12. A suitable gripper system 80 is described more fully in International Patent Application No. PCT/US2015/012471, titled "Formation Of Elongated Glass Components With Low Bow Using A Gripper Device" and filed on Jan. 22, 2015 by the assignees of the subject application, Heraeus Tenevo LLC & Heraeus Quarzglas GmbH & Co. KG. In one embodiment, the gripper system 80 is included with the apparatus 10 by attaching the gripper system 10 to the frame 12.

As illustrated in FIG. 2, the apparatus 10 is aligned along a Cartesian coordinate system. A Cartesian coordinate system (X, Y, Z) is a coordinate system that specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

The gripper system 80 includes clamping elements 82 and mounting elements 84 attaching the clamping elements 82 to the gripper system 80. The gripper system 80 may move vertically parallel to the length of the frame 12 (defined in FIG. 2 as the Z direction). The mounting elements 84 allow translational movement of the clamping elements 82 in the X direction and the Y direction (i.e., to any position within the X-Y plane). (Although neither necessary nor preferred, a chuck system may also be used that allows rotation—especially if a torch, rather than a furnace, were to provide the heating element.) In one embodiment, the mounting elements 84 are X-Y tables including a pair of arms mounted on linear bearings or linear rails and a motor, for example a manual or servo motor drive, to control movement of the arms. The mounting elements 84 are further low-friction devices, so that a force applied to the clamping elements 82 by an external object will result in the clamping elements 82 being deflected along the mounting elements 84 rather than the clamping elements 82 applying a resistive force to the external object.

Once the preform has formed, the gripper system 80 may be attached by moving the clamping elements 82 into contact with the bottom collar 44 or (as shown in FIG. 2) the bottom collar holder and vacuum unit 52. The clamping elements 82 preferably should not contact the preform. The clamping elements 82 may be sized to have convex regions having the opposite shape of the bottom collar 44, so that the clamping elements 82 fit securely around the bottom collar 44 without causing damage to the bottom collar 44. The clamping elements 82 may contact all or (as shown in FIG. 2) only a portion of the outside surface of the bottom collar 44 or the bottom collar holder and vacuum unit 52. In an exemplary embodiment, the clamping elements 82 may be made of a high temperature compressible material such as calcium silicate, asbestos, compressed glass, or ceramic fibers (e.g., rock wool) or high temperature rubber (e.g., silicone or fluoropolymer elastomers).

The clamping elements 82 are first aligned with the center of the bottom collar 44 or the bottom collar holder and vacuum unit 52 by determining the center of the bottom collar 44 or the bottom collar holder and vacuum unit 52 and then moving the clamping elements 82 into alignment with the center in the X direction. In some embodiments, the clamping elements 82 may be aligned to an estimated center of the bottom collar 44 or the bottom collar holder and vacuum unit 52, for example the expected center based on the desired travel path. In other embodiments, in order to more accurately align the clamping elements 82 with the bottom collar 44 or the bottom collar holder and vacuum unit 52, the apparatus 10 may further include a sensing element capable of locating the center of the bottom collar 44 or the bottom collar holder and vacuum unit 52 and a computer for determining the center from the output of the sensing element. The sensing element may include one or more laser devices, a camera/vision system, or a mechanical contact (dial indicator) system. In an exemplary embodiment, the sensing element may be attached to the gripper system 80 or may be external to the gripper system 80, for example attached to the frame 12. In another embodiment, the sensing element may be external to both the gripper system 80 and the frame 12, for example cameras. Because the gripper system 80 includes further elements to prevent misalignment, it is not necessary for the gripper system 80 to perfectly align with the center of the bottom collar 44 or the bottom collar holder and vacuum unit 52.

Once the clamping elements 82 are aligned, the clamping elements 82 are brought into contact with the bottom collar 44 or the bottom collar holder and vacuum unit 52 by movement of the mounting elements 84 in the X direction. The mounting elements 84 may be moved by any suitable mechanism, for example a motor used to control the pair of arms of an X-Y table. Because the mounting elements 84 are low-friction devices, if the clamping elements 82 attempt to attach to the bottom collar 44 or the bottom collar holder and vacuum unit 52 while not properly aligned with the center, the force of the bottom collar 44 or the bottom collar holder and vacuum unit 52 pushing against the clamping elements 82 will move the clamping elements 82 into an aligned position instead of the bottom collar 44 or the bottom collar holder and vacuum unit 52 being moved. The mounting elements 84 may further include a locking mechanism that may be engaged and disengaged to prevent movement of the clamping elements 82 once the clamping elements 82 are attached to the bottom collar 44 or the bottom collar holder and vacuum unit 52. While the clamping elements 82 are being moved into position, the locking mechanism is unlocked, so that the clamping elements 82 may be moved by the motor while still being displaced by any additional force applied to the clamping elements 82. Once the clamping elements 84 are in contact with the bottom collar 44 or the bottom collar holder and vacuum unit 52, the locking mechanism is engaged to prevent further movement of the clamping elements 82 in the X-Y plane.

To detect misalignment, in one embodiment the gripper system 80 further includes a force sensing device, such as a load cell 68, to sense reaction forces and to measure the reaction force that occurs during the process of the clamping elements 82 attaching to the bottom collar 44 or the bottom collar holder and vacuum unit 52. Load cells are transducers that convert a force applied to the clamping elements 82 through a strain gauge (not shown) of each load cell into an electrical signal. The electrical signal may then be measured and correlated to the force applied to the strain gauge. Exemplary load cells include hydraulic load cells, pneumatic load cells, and strain gauge load cells. Should the clamping elements 82 not be properly aligned with the center of the bottom collar 44 or the bottom collar holder and vacuum unit 52, the reaction force will be greater than if the clamping elements 82 are properly aligned. By measuring the reaction force with the force sensing device, misalignment may be detected and corrected before the clamping elements 82 apply a force to the bottom collar 44 or the bottom collar holder and vacuum unit 52 sufficient to result in movement of the bottom collar 44 or the bottom collar holder and vacuum unit 52. In one embodiment, the force sensing device may be used in conjunction with the low-friction mounting elements 84, where the speed at which the clamping elements 82 are attached to the bottom collar 44 or the bottom collar holder and vacuum unit 52 is slowed in response to a greater-than-expected reaction force in order to allow the clamping elements 82 to move on the mounting elements 84 into an aligned position. In an exemplary embodiment, the clamping elements 82 may be moved toward the bottom collar 44 or the bottom collar holder and vacuum unit 52 at a rate ranging from approximately 50 mm/minute to approximately 100 mm/minute while no misalignment is detected by the force sensing device, and the rate reduced to approximately 10 mm/minute to approximately 25 mm/minute if misalignment is detected. In other applications, the clamping speeds may exceed these ranges.

In summary, the gripper system 80 helps to support the preform assembly weight (which may be about 350 kg or more), replacing the conventional full-contact puller wheel system. The gripper system 80 permits floating positioning of the glass body 20 used to make the preform in the horizontal (X-Y) plane and precision linear movement in the vertical (Z) direction for exact alignment and control of preform geometry and preform tipping process. Especially when the gripper system 80 is incorporated, the apparatus 10 avoids lateral or transverse forces on the preform, thereby minimizing and perhaps eliminating preform bow; can monitor glass behavior during heating using a load cell; and permits the use of physics (conservation of mass) to control dimensions precisely (eliminating the expense of conventional online measurements and feedback controls).

A controller is a hardware device or a software program that manages or directs the flow of data (i.e., facilitates communication) between two components. The apparatus 10 includes a controller 88. The controller 88 provides the ability to obtain data from, for example, the load cell 68; the gripper system 80; the top and bottom collar holder and vacuum units 52, 54; and the vacuum and treatment gas systems, and to use that data to control the other components of the apparatus 10 and the related upward collapse process. The controller 88 has programmed in it, in a manner well-known to those skilled in the art, a preset control program or routine to assure efficiently the optimum heating and movement process recipe. More specifically, the controller 88 can define, for example, the velocities V1 and V2, the flow rates of gases, and the pressure of the vacuum pumps. The controller 88 helps to assure a robust and reproducible "one button" automated process for production.

In another embodiment of the invention, a variable seal 100 is provided around a cylinder of glass where the glass cylinder enters or exits a high-temperature furnace. The variable seal 100 is able to accommodate relatively large changes in the diameter of the glass cylinder; such accommodation is difficult to achieve with other devices. Other devices can only accommodate diameter differences of around 10 millimeters. The variable seal 100 can accommodate diameter differences up to 150 millimeters or more. The variable seal 100 also achieves a tight enclosure around any diameter in its range whereas other devices can only seal well around a limited set of diameters.

Figure 4:
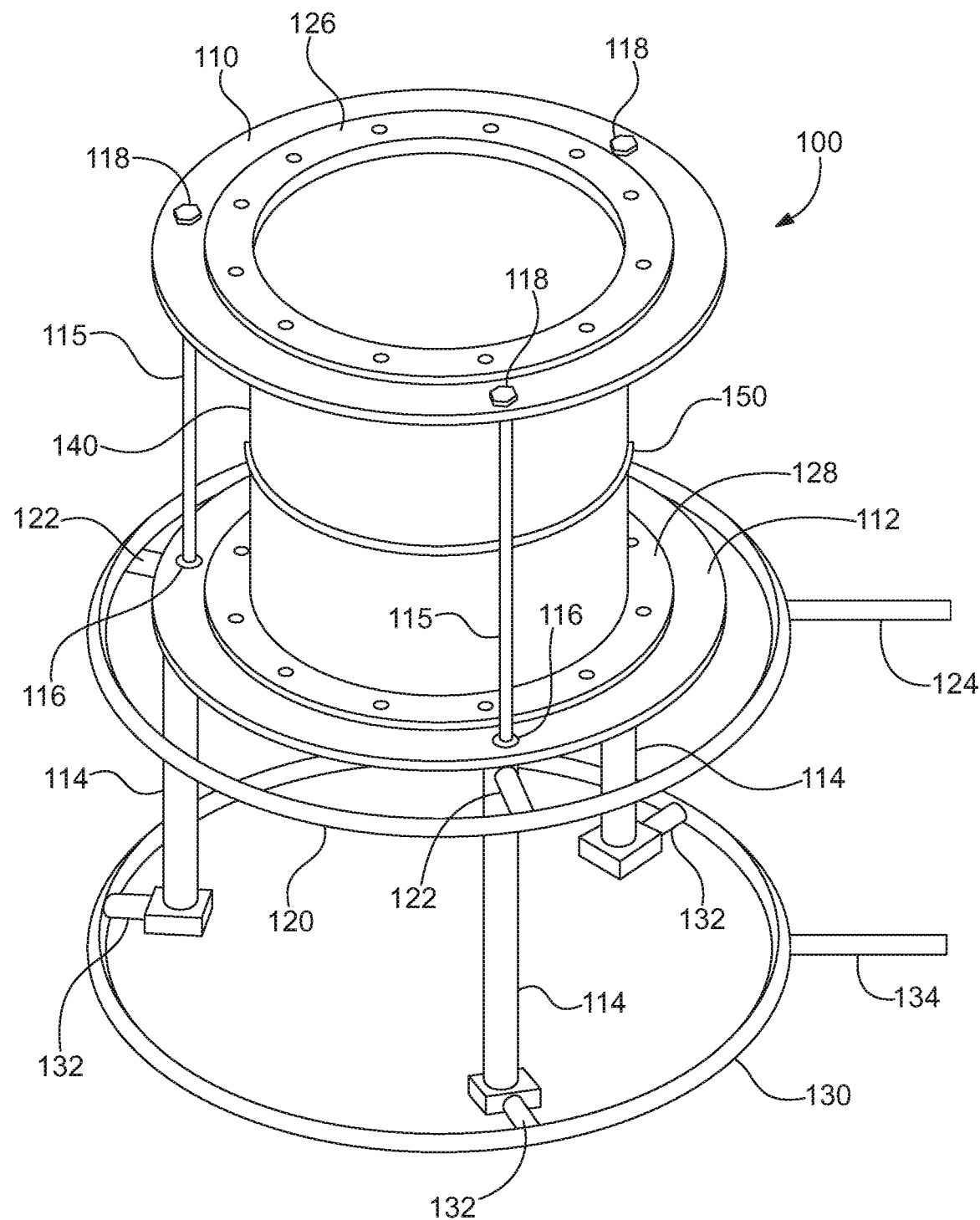
FIG. 4 illustrates one embodiment of the variable seal that can be used in combination, for example, with the apparatus of FIG. 1 or 2.

One embodiment of the variable seal 100 is illustrated in FIG. 4. As illustrated, the variable seal 100 has an upper support ring 110 and a lower support ring 112 connected by at least one air cylinder 114 and, preferably, by a plurality of air cylinders 114. Although metal is preferred, any suitable material can be used to construct the upper support ring 110 and the lower support ring 112. Further, although any suitable number of air cylinders 114 might suffice, three air cylinders 114 are illustrated. Still further, although a variety of air cylinders 114 would suffice, double-acting air cylinders 114 work well.

The distance between the upper support ring 110 and the lower support ring 112 can be changed by moving an air cylinder extension rod 115 associated with each air cylinder 114 in and out of the body of the respective air cylinder 114. The body of the air cylinder 114 is connected to the lower support ring 112. The air cylinder extension rod 115 extends through a hole 116 in the lower support ring 112 and is attached to the upper support ring 110, typically (but not necessarily) using a fastener 118.

The variable seal 100 has an upper compressed air manifold 120 and a lower compressed air manifold 130. The motion of the air cylinder extension rods 115 is controlled by admitting compressed air into either the upper compressed air manifold 120 or the lower compressed air manifold 130. The upper compressed air manifold 120 is connected to the upper ends of the bodies of the air cylinders 114 via upper manifold connections 122; the lower compressed air manifold 130 is connected to the lower ends of the bodies of the air cylinders 114 via lower manifold connections 132. Air (or another suitable fluid) is delivered to the upper compressed air manifold 120 through an upper port 124; air (or another suitable fluid) is delivered to the lower compressed air manifold 130 through a lower port 134. Delivering compressed air into the upper compressed air manifold 120 causes the upper support ring 110 and the lower support ring 112 to move closer together. Delivering compressed air into the lower compressed air manifold 130 causes the upper support ring 110 and the lower support ring 112 to move farther apart.

A high-temperature fabric cylinder 140 is attached to the upper support ring 110 and to the lower support ring 112. Although any suitable attachment mechanism would suffice, attachment may be made by clamping the fabric cylinder 140 both (a) between an upper clamp ring 126 and the upper support ring 110, and (b) between a lower clamp ring 128 and the lower support ring 112. The fabric cylinder 140 consists of a tube of fabric. A number of different fabrics can be used to form the tube. In the process of making an optical fiber preform or optical fiber, which uses a high-temperature furnace, the fabric used should be capable of withstanding these temperatures. Woven silica fabrics or carbon fiber fabrics can be used under these conditions. It is also possible to use aluminosilicate fabrics for even higher temperature exposures.

Around the approximate center of the fabric cylinder 140 is stretched a coil spring 150 which tends (is biased) to close the fabric cylinder 140. The extended length of the spring 150 is predetermined to be approximately the circumference of the fabric cylinder 140. The un-extended length of the spring 150 is predetermined to be approximately equal to the smallest circumference of the glass cylinder around which the variable seal 100 is desired to seal. The tension of the spring 150 is typically, for example, between about 9 newtons (two pounds) and 18 newtons (four pounds). When the upper support ring 110 and the lower support ring 112 are moved towards each other, the spring 150 tends to close the fabric cylinder 140. When the upper support ring 110 and the lower support ring 112 are moved away from each other, the fabric cylinder 140 opens and stretches the spring 150.

Figure 5:
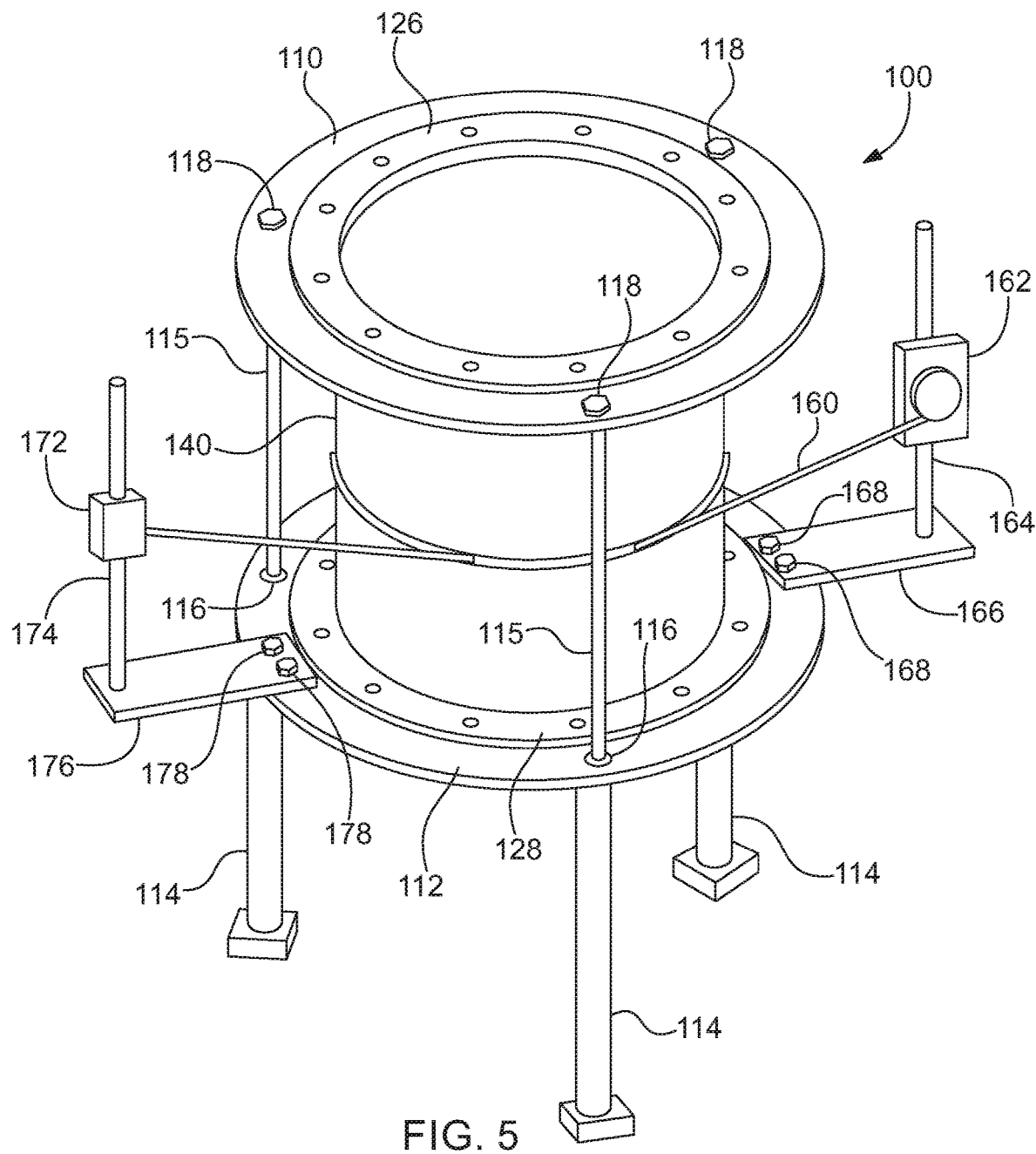
FIG. 5 illustrates another embodiment of the variable seal that can be used in combination, for example, with the apparatus of FIG. 1 or 2.

In another embodiment of the variable seal 100, shown in FIG. 5, the spring 150 is replaced by a system including a cable 160 which is wrapped around the fabric cylinder 140 with one end attached to a constant-force retractor 162 and the other fixed to a post or clamp 172. The constant-force retractor 162 is free to slide up and down a first support rod 164. The first support rod 164 is mounted on a first extension plate 166 which, in turn, is affixed (typically but not necessarily) by fasteners 168 to the lower support ring 112 proximate the outer circumference of the lower support ring 112.

Similarly, the clamp 172 is free to slide up and down a second support rod 174. The second support rod 174 is mounted on a second extension plate 176 which, in turn, is affixed (typically but not necessarily) by fasteners 178 to the lower support ring 112 proximate the outer circumference of the lower support ring 112. Preferably, the constant-force retractor 162 and the clamp 172 are located directly opposite (180 degrees apart) each other on either side of the fabric cylinder 140. The first and second extension plates 166, 176 are located in substantially the same horizontal plane (which extends in the X-Y plane of the coordinate system shown in FIG. 2) as the lower support ring 112. The vertical or longitudinal axes of the first and second support rods 164, 174 are parallel to, and offset from, the vertical or longitudinal axis of the lower support ring 112. (These longitudinal axes extend in the Z direction of the coordinate system shown in FIG. 2.)

Linear-motion bearings in the constant-force retractor 162 make it easier for the constant-force retractor 162 to slide up and down the first support rod 164. Similarly, linear-motion bearings in the clamp 172 make it easier for the clamp 172 to slide up and down the second support rod 174. Thus, the linear-motion bearings make it easier for the closing system to follow the motion of the center of the fabric cylinder 140 as the distance between the upper and lower support rings 110, 112 changes.

When the constant-force retractor 162 is actuated, the constant-force retractor 162 draws the cable 160 towards the constant-force retractor 162 thereby tightening the cable 160 around the fabric cylinder 140. The preferred tension on the constant-force retractor 162 is from about 4.5 newtons (one pound) to 22 newtons (five pounds). The most preferred tension is from about 9 newtons (two pounds) to 13 newtons (three pounds). When the constant-force retractor 162 releases the cable 160, the cable 160 loosens around the fabric cylinder 140.

Figure 5A:
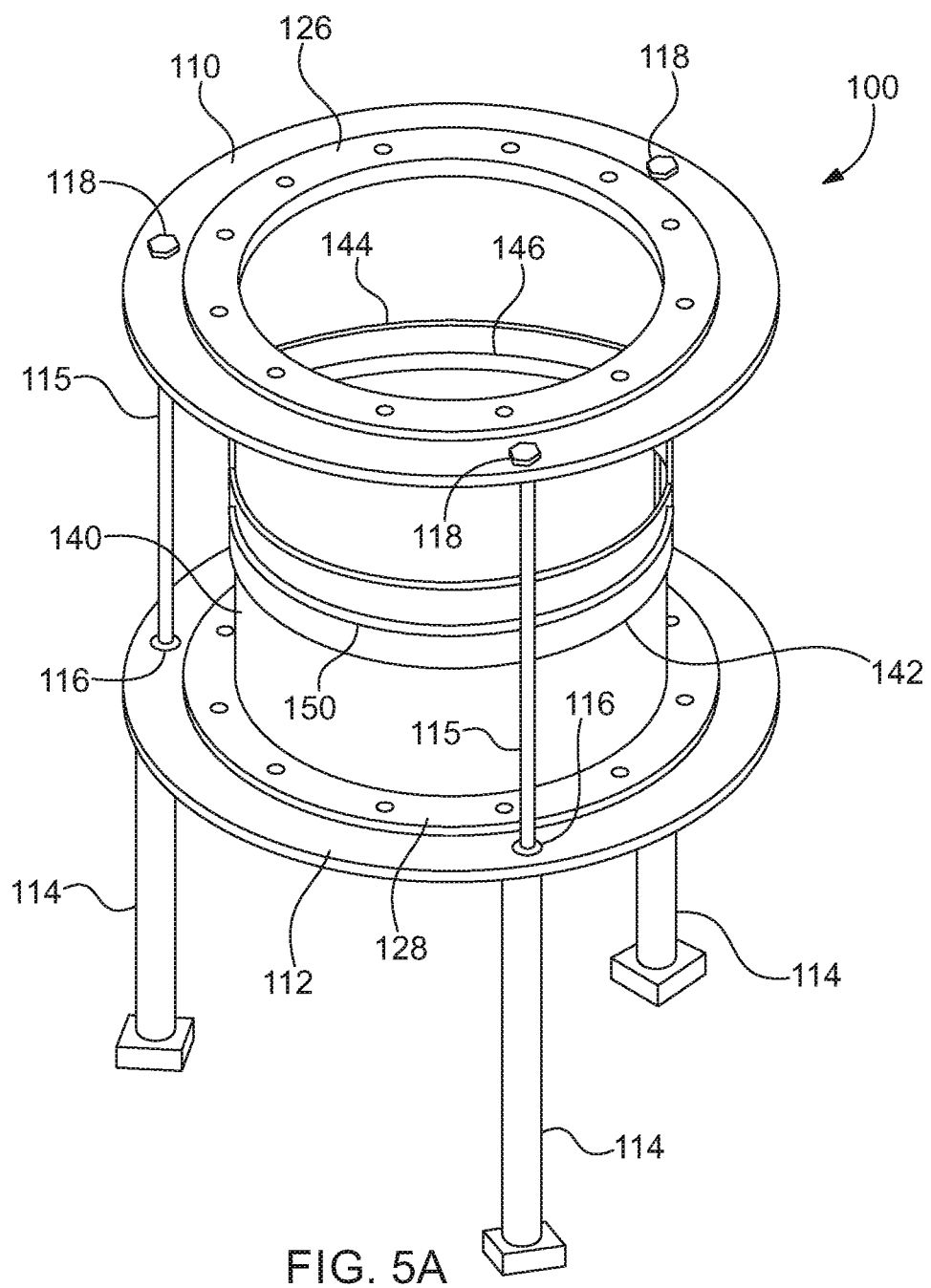
FIG. 5A illustrates still another embodiment of the variable seal that can be used in combination, for example, with the apparatus of FIG. 1 or 2, incorporating strips of high-temperature cloth.

In another embodiment of the variable seal 100, shown in FIG. 5A, a band 142 of high-temperature cloth 142 is attached to the outside of the fabric cylinder 140 so that the centerline of the band 142 coincides with the centerline of the fabric cylinder 140 where the spring 150 surrounds the fabric cylinder 140. The band 142 may be made of cloth. More specifically, the band 142 may be 50-70 mm wide, knitted, high-temperature tape. The purpose of the band 142 is to protect the fabric cylinder 140 from abrasion by the spring 150. The band 142 can be replaced when the band 142 shows signs of wear.

As further shown in FIG. 5A, a belt 144 is attached to the inside of the fabric cylinder 140 so that the centerline of the belt 144 coincides with the centerline of the fabric cylinder 140 where the spring 150 surrounds the fabric cylinder 140. The belt 144 may be made of cloth. More specifically, the belt 144 may be knitted, high-temperature tape. The belt 144 is only attached at its upper edge. In use, the belt 144 is not allowed to come between the fabric cylinder 140 and the glass cylinder passing through the fabric cylinder 140, but is folded or tucked down around this interface. The purpose of the belt 144 is to improve the seal between the fabric cylinder 140 and the glass cylinder and further restrict gas flow.

As still further shown in FIG. 5A, a ring 146 of silica glass wool is attached to the inside of the fabric cylinder 140, roughly at the position of the spring 150. The cross-sectional diameter of the ring 146 is approximately 50 mm and the ring 146 is attached very loosely and at only a few points around the inside circumference of the fabric cylinder 140. Again, the purpose of the ring 146 is to improve the seal. In use, the ring 146 is compressed between the fabric cylinder 140 and the glass cylinder passing through the fabric cylinder 140 and helps improve the seal.

All three of the band 142, the belt 144, and the ring 146 can be used together, as illustrated in FIG. 5A. Alternatively, the band 142, the belt 144, and the ring 146 can be used separately. Other alternatives would be to use different combinations of two of the three components.

The embodiment of the variable seal 100 shown in FIG. 4 and the embodiment of the variable seal 100 shown in FIG. 5A include the biased spring 150. The alternative embodiment shown in FIG. 5 includes the cable 160, the constant-force retractor 162, and the clamp 172. Both embodiments tighten and loosen the fabric cylinder 140, with the upper and lower support rings 110, 112 moving towards and away from each other like an accordion. Other systems could be used to tighten and loosen the fabric cylinder 140. In addition, the embodiments shown in FIGS. 4, 5, and 5A can be used independently, as illustrated, or in combination either with each other or with another tightening and loosening system.

Figure 6:
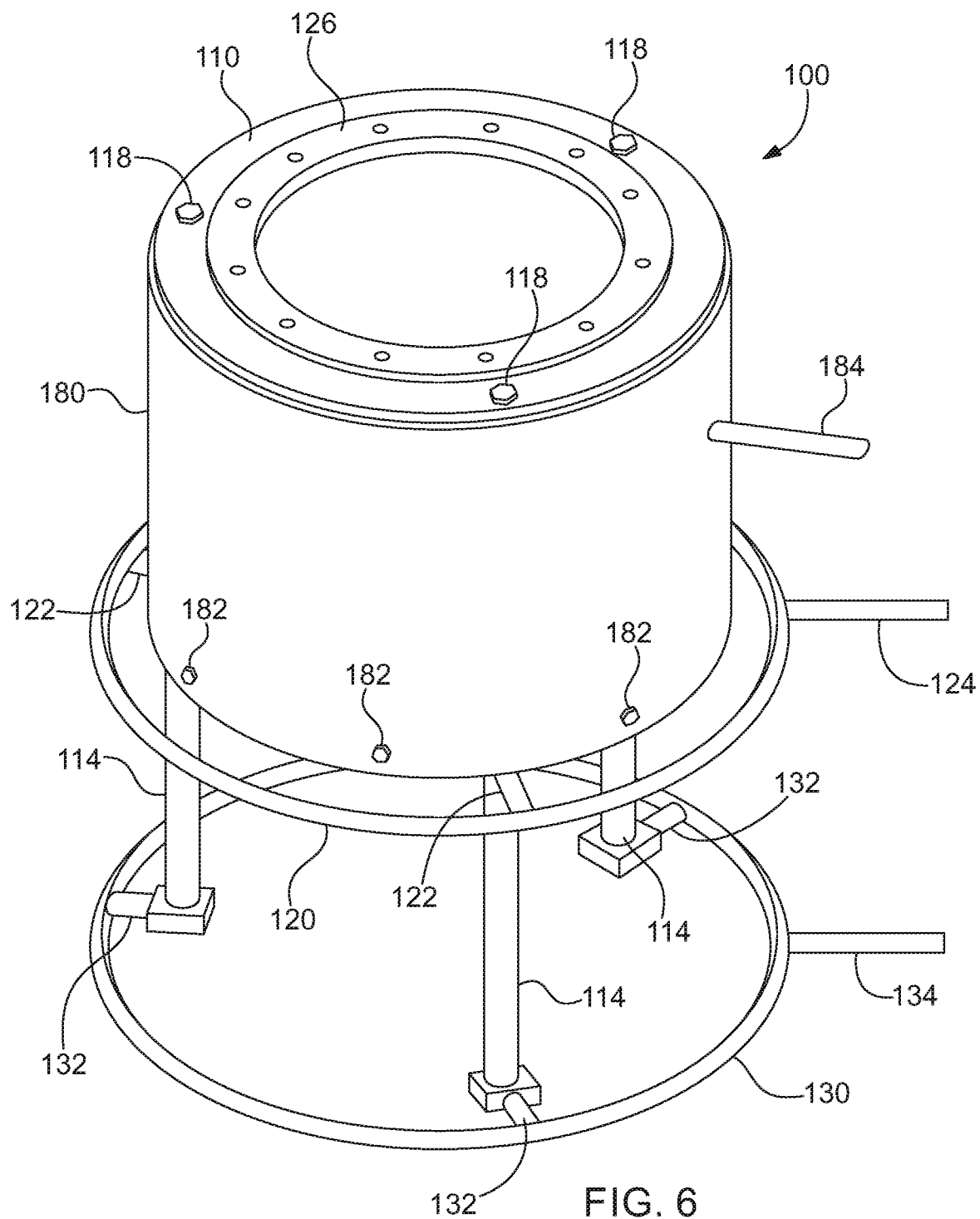
FIG. 6 illustrates a further embodiment of the variable seal that can be used in combination, for example, with the apparatus of FIG. 1 or 2, incorporating an enclosure to form an even more complete seal.

The main purpose of the variable seal 100 is to minimize gas flow from the open end of the apparatus 1p, 10. Often, the variable seal 100 described above is sufficient to achieve that purpose. If an even more complete seal is desired, however, the fabric cylinder 140 and the related components (e.g., the upper and lower support rings 110, 112) of the variable seal 100 can be surrounded by and enclosed in a cylindrical "can" or enclosure 180 as shown in FIG. 6. FIG. 6 illustrates the enclosure 180 used in combination with the embodiment of the variable seal 100 shown in FIG. 4. Of course, the enclosure 180 could also be used (upon suitable modification) in combination with the embodiment of the variable seal 100 shown in FIG. 5. Although metal is preferred, any suitable material can be used to construct the enclosure 180.

As illustrated in FIG. 6, the enclosure 180 is attached only to the lower support ring 112 so that the upper support ring 110 is free to move up and down inside the enclosure 180. The enclosure 180 is attached to the lower support ring 112 typically (but not necessarily) using a plurality of fasteners 182. Gas can be fed into the enclosure 180 at higher than atmospheric pressure to further minimize the gas flow from the apparatus 1p, 10. The gas can be delivered through a single port 184, as illustrated, or it can be fed through a manifold which delivers gas at multiple points around the circumference of the enclosure 180.

The gas fed into the enclosure 180 is preferably inert. The inert gas prevents oxygen from entering the apparatus 1p, 10 at its opening. The inert gas stream maintains the pressure inside the apparatus 1p, 10 higher than that of the atmosphere at all times.

In the embodiments described above, the variable seal 100 includes the fabric cylinder 140 attached at one end to the upper support ring 110 and at its opposite end to the lower support ring 112. Around the center of the fabric cylinder 140 is a mechanism that tends to close the fabric cylinder 140. The mechanism can be a coil spring 150 that is stretched around the fabric cylinder 140, as shown in FIG. 4 and in FIG. 5A. The length of the un-extended spring 150 is predetermined to be approximately the minimum circumference of the (typically glass) cylinder around which the seal is desired. The mechanism can also be the cable 160 that is attached at one end to the clamp 172 and at the other end to the constant-force retractor 162.

The distance between the upper support ring 110 and the lower support ring 112 can be controlled by moving one support ring relative to the other. Several different components can be used to adjust the distance between the upper support ring 110 and the lower support ring 112. The air cylinders 114, cylinder extension rods 115 which extend from and retract into the bodies of the air cylinders 114, and the compressed air manifolds 120, 130 described above are preferred, in part, because a high-pressure air supply to the air cylinders 114 can be controlled by a system of solenoid valves and regulators which, in turn, can be directed by the controller 88. By applying air to the appropriate end of the air cylinder 114, the distance between the upper support ring 110 and the lower support ring 112 can be increased or decreased in a controlled manner. An advantage of the air cylinder 114 is that it operates very quickly.

An alternative component that could be used to control the spacing between the upper support ring 110 and the lower support ring 112 is a screw jack. In this alternative, a driven worm screw drives a threaded rod that translates up or down and carries a mobile plate. The mobile plate could be either the upper support ring 110 or the lower support ring 112, with the other plate fixed. If two screw jacks were used, both the upper support ring 110 and the lower support ring 112 could be mobile with their movement coordinated.

As the distance between the upper support ring 110 and the lower support ring 112 is increased, the fabric cylinder 140 is opened and the spring 150 around the fabric cylinder 140 is stretched or more cable 160 is pulled from the constant-force retractor 162. When the distance between the upper support ring 110 and the lower support ring 112 is decreased, the spring 150 or the cable 160 pulls the fabric cylinder 140 closed. In operation, with a glass cylinder passing through the fabric cylinder 140, the action of the spring 150 or the cable 160 presses the fabric cylinder 140 against the circumference of the glass cylinder creating a seal. By varying the distance between the upper support ring 110 and the lower support ring 112, the seal can be maintained even when the diameter of the glass cylinder varies. Using the variable seal 100, the seal can be maintained for diameters of glass cylinders that vary from about 50 mm to 210 mm. The sealing range can be modified by suitable changes in the diameter of the upper support ring 110 and the lower support ring 112, changes in the diameter of the fabric cylinder 140, and changes in the height of the fabric cylinder 140.

Figure 7:
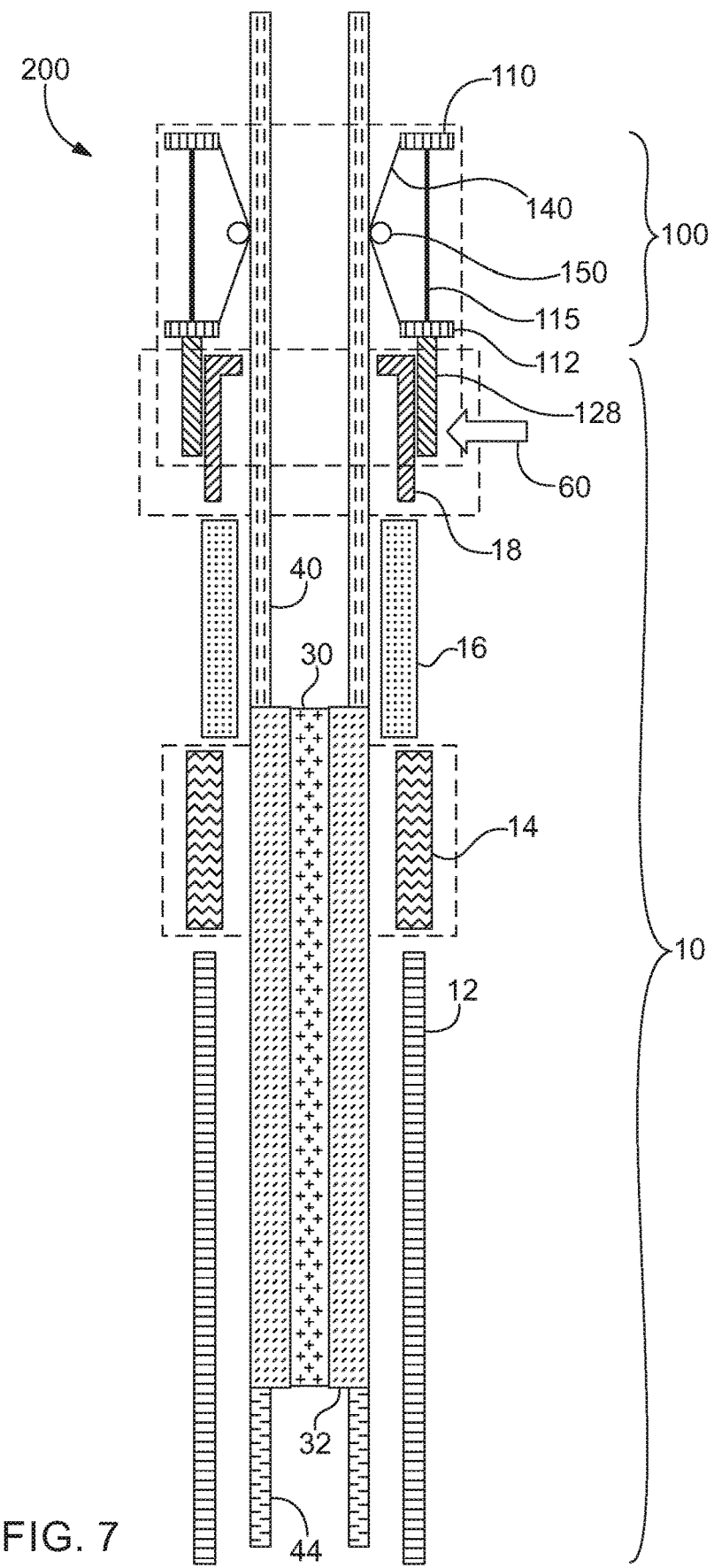
FIG. 7 is a schematic illustration of the variable seal shown in FIG. 4 in combination with the apparatus shown in FIG. 2 and shows sealing against a relatively large collar.
Figure 8:
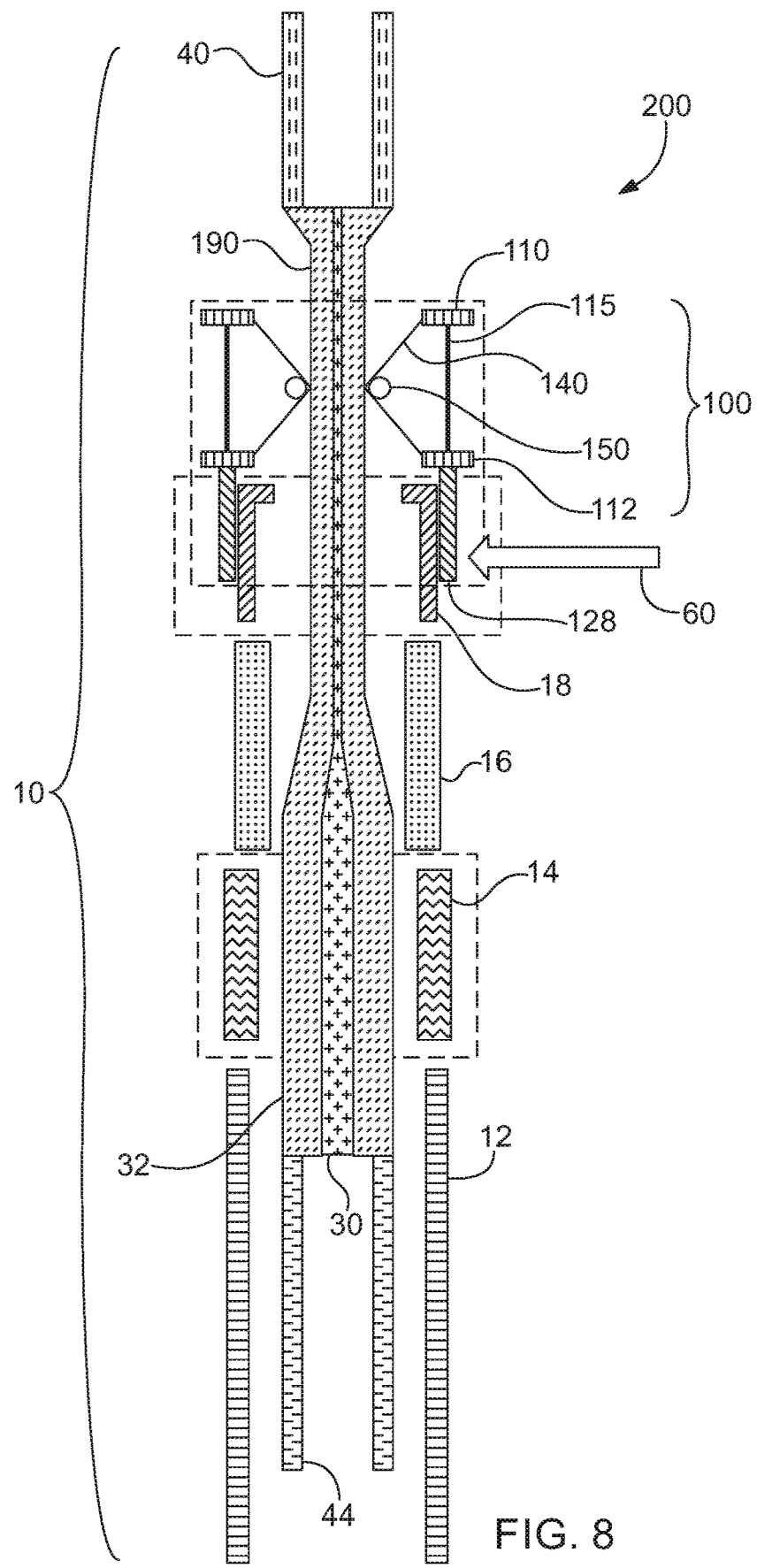
FIG. 8 is a schematic illustration of the variable seal shown in FIG. 4 in combination with the apparatus shown in FIG. 2 and shows sealing against a smaller diameter preform.

FIGS. 7 and 8 illustrate the flexibility, adjustability, and range of application of the variable seal 100. FIGS. 7 and 8 specifically illustrate the embodiment of the variable seal 100 shown in FIG. 4 as used in combination with the apparatus 10 shown in FIG. 2 for producing an optical fiber preform using the upward collapse process. FIG. 7 shows the seal 100 providing a seal against a relatively large top collar 40. FIG. 8 shows the seal 100 providing a seal against a relatively small diameter preform, namely, a collapsed and stretched glass body 190. In each of FIGS. 7 and 8, the combination of the seal 100 and the apparatus 10 forms a system 200.

EXAMPLE

Figure 9:
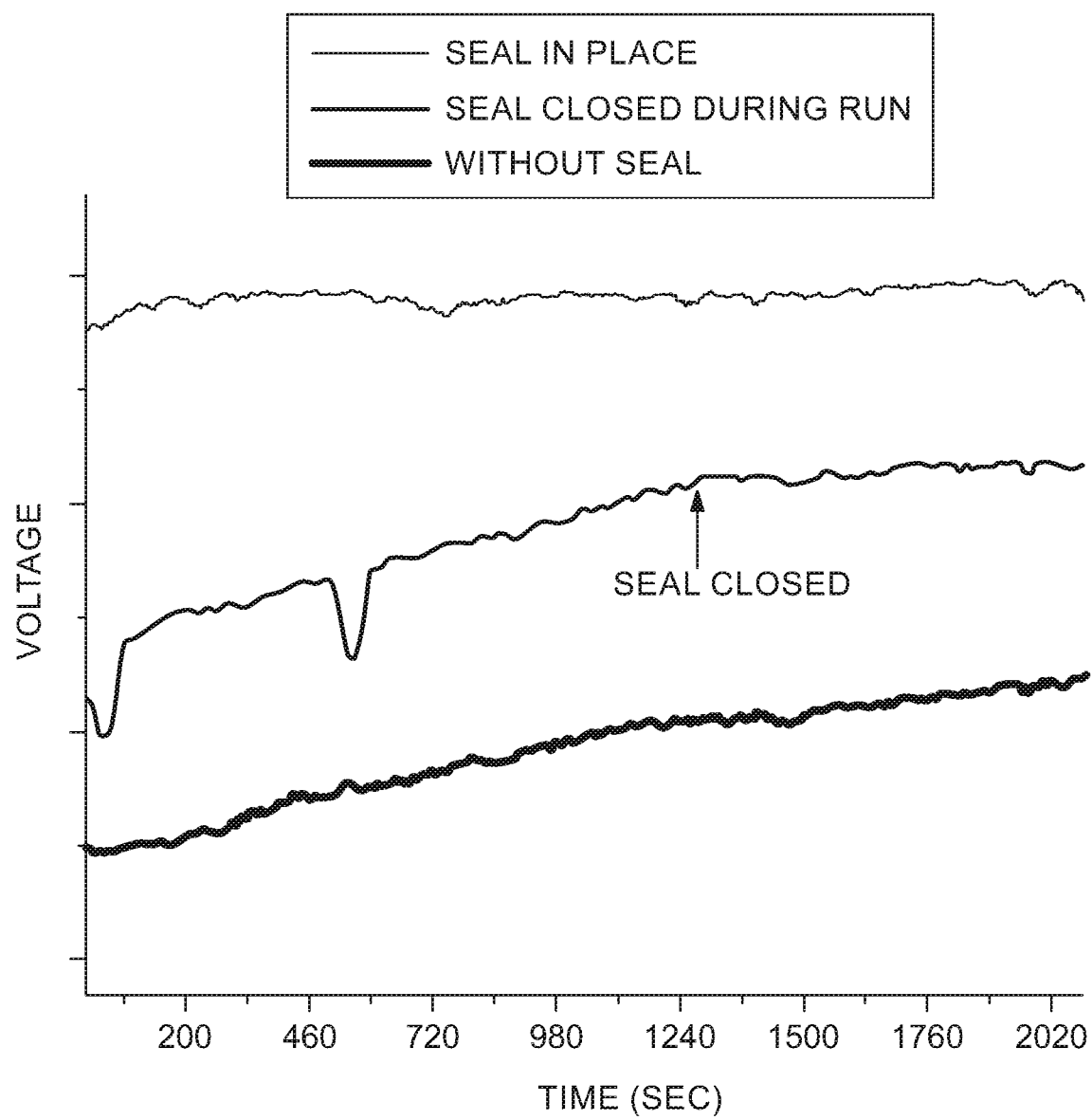
FIG. 9 is a graph showing the positive effect, of the variable seal shown in FIG. 4 when used in combination with the apparatus shown in FIG. 2, in avoiding degradation of the apparatus.

With reference to FIG. 9, the following example is included to more clearly demonstrate the overall nature of the invention. This example is exemplary, not restrictive, of the invention. FIG. 9 is a graph showing the effect of the variable seal 100 on the degradation of the apparatus 10 and, specifically, the heating zone 16 (which corresponds to the furnace 6p of the apparatus 1p shown in FIG. 1). The heating element that creates the heating zone 16 in the upward-collapse apparatus 10 is made of graphite. If oxygen is allowed into the apparatus 10 during operation, the graphite oxidizes and the thickness of the walls of the heating zone 16 decreases which has a negative effect on the lifetime of the heating zone 16 and, therefore, of the apparatus 10. This degradation can be monitored using the voltage of the heating zone 16 during operation. If the voltage is increasing at a constant power, this means that the heating zone 16 is oxidizing.

FIG. 9 shows a graph of the voltage of the heating zone 16 during three different runs. In one run, reflected by the bottom plot, the variable seal 100 was not used. During the constant power phase of this run, the voltage of the heating zone 16 increased steadily. In the second run, reflected by the middle plot, the variable seal 100 was in place but was not completely closed until partway through the run. The voltage in this case increased steadily up to the point where the variable seal 100 was completely closed. From this point, the voltage was steady. In the third run, reflected by the top plot, the variable seal 100 was in place and closed during the entire run. The voltage of the heating zone 16 remained essentially constant during this run indicating that the graphite heating element of the heating zone 16 suffered little degradation.

World-wide connected devices, cloud services, 5G (5th generation mobile networks or 5th generation wireless systems, which denotes a major phase of mobile telecommunications standards), and Industry 4.0 (or the fourth industrial revolution, the current trend of automation and data exchange in manufacturing technologies including cyber-physical systems, the Internet of things, and cloud computing), and other advances are driving an exponentially increasing demand for bandwidth. Therefore, optical fiber manufacturers must increase their output and productivity. For next generation optical fiber manufacturing, very large preforms drawn at high speeds are required. The result of the variable seal 100, especially as part of the system 200 including the upward collapse apparatus 10, meets those requirements.

The variable seal 100 accommodates an essentially infinitely variable sealing diameter over a large diameter range. The variable seal 100 can be used to seal the top and bottom of a wide variety of heating furnaces around an object. More specifically, the variable seal 100 can be used to seal the top of optical fiber draw towers and other apparatus used to heat a glass preform and draw an optical fiber. Preform customers benefit from the variable seal 100 because the variable seal 100 allows them greater freedom to use preforms with different diameters in the preform and handle. This allows optical fiber manufacturers to produce preforms that improve the yield in the customer's processes.

The foregoing description of preferred embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims. It is expressly intended, for example, that all ranges broadly recited in this document include within their scope all narrower ranges which fall within the broader ranges. It is also expressly intended that, as is understood by those skilled in the art, certain steps included in the process may be omitted; certain additional steps may be added; and the order of the steps may be altered from the specific order described.

What is claimed:

1. A variable seal for shielding from contaminants both an object having a circumference and a diameter to be heated in, and a heating element of, a furnace where the object enters or exits the furnace, the variable seal comprising:
   a first support ring;
   a second support ring separated from the first support ring by a distance;
   a means for controlling the distance between the first support ring and the second support ring;
   a fabric cylinder having a center, being attached to the first support ring and to the second support ring, being located where the object enters or exits the furnace, and surrounding at least a portion of the object; and
   a mechanism including a coil spring or a cable, the mechanism engaging the approximate center of the fabric cylinder to close the fabric cylinder as the controlling means decreases the distance between the first support ring and the second support ring and to open the fabric cylinder as the controlling means increases the distance between the first support ring and the second support ring, whereby the fabric cylinder continuously contacts the circumference of the object regardless of the diameter of the object.

2. The variable seal of claim 1, wherein the controlling means includes at least one air cylinder connecting the first support ring and the second support ring, the at least one air cylinder having a body with a first end and a second end and being connected to the second support ring, and an extension rod connected to the first support ring and being slidably disposed in the body to extend from and retract into the body; a first compressed air manifold connected to the first end of the body of the at least one air cylinder such that, upon receipt of compressed air, the first compressed air manifold causes the first support ring and the second support ring to move closer together and decrease the distance between the first support ring and the second support ring; and a second compressed air manifold connected to the second end of the body of the at least one air cylinder such that, upon receipt of compressed air, the second compressed air manifold causes the first support ring and the second support ring to move farther apart and increase the distance between the first support ring and the second support ring.

3. The variable seal of claim 1, wherein the mechanism includes a coil spring wrapped around the fabric cylinder and biased to close the fabric cylinder.

4. The variable seal of claim 1, wherein the mechanism includes a cable wrapped around the fabric cylinder, the cable having one end attached to a constant-force retractor and another end fixed to a clamp, whereby the constant-force retractor can either draw the cable inward and tighten the cable around the fabric cylinder or release the cable and loosen the cable around the fabric cylinder.

5. The variable seal of claim 4, wherein the constant-force retractor and the clamp are located directly opposite each other on either side of the fabric cylinder and the mechanism further includes a first support rod on which the constant-force retractor slides and a second support rod on which the clamp slides, allowing the constant-force retractor and the clamp to follow the motion of the center of the fabric cylinder as the distance between the upper and lower support rings changes.

6. The variable seal of claim 1, further comprising one or any combination of a band, a belt, or a ring located at the approximate center of the fabric cylinder to improve the seal between the object and the fabric cylinder, to protect the fabric cylinder from abrasion by the mechanism, or both.

7. The variable seal of claim 1, further comprising a first clamp ring and a second clamp ring, the first clamp ring attaching the fabric cylinder to the first support ring and the second clamp ring attaching the fabric cylinder to the second support ring.

8. The variable seal of claim 1, wherein the fabric cylinder is made of woven silica, carbon fiber, or aluminosilicate.

9. The variable seal of claim 1, further comprising an enclosure attached to the second support ring, enclosing the fabric cylinder, allowing the first support ring to move within the enclosure, and receiving gas at higher than atmospheric pressure.

10. A system for creating a glass preform from a glass body having a circumference and a diameter, the system comprising:
    an apparatus defining a first opening to receive the glass body, a second opening from which the glass preform exits, and a heating zone having a heating element to heat the glass body; and
    a variable seal for shielding from contaminants both the glass body and the heating element proximate the first opening, the second opening, or both openings, the variable seal including:
    (a) a first support ring,
    (b) a second support ring separated from the first support ring by a distance,
    (c) a means for controlling the distance between the first support ring and the second support ring,
    (d) a fabric cylinder having a center, being attached to the first support ring and to the second support ring, being located proximate the first opening, the second opening, or both openings, and surrounding at least a portion of the glass body, and
    (e) a mechanism including a coil spring or a cable, the mechanism engaging the approximate center of the fabric cylinder to close the fabric cylinder as the controlling means decreases the distance between the first support ring and the second support ring and to open the fabric cylinder as the controlling means increases the distance between the first support ring and the second support ring, whereby the fabric cylinder continuously contacts the circumference of the glass body regardless of the diameter of the glass body.

11. The apparatus of claim 10, wherein the controlling means includes at least one air cylinder connecting the first support ring and the second support ring, the at least one air cylinder having a body with a first end and a second end and being connected to the second support ring, and an extension rod connected to the first support ring and being slidably disposed in the body to extend from and retract into the body; a first compressed air manifold connected to the first end of the body of the at least one air cylinder such that, upon receipt of compressed air, the first compressed air manifold causes the first support ring and the second support ring to move closer together and decrease the distance between the first support ring and the second support ring;

and a second compressed air manifold connected to the second end of the body of the at least one air cylinder such that, upon receipt of compressed air, the second compressed air manifold causes the first support ring and the second support ring to move farther apart and increase the distance between the first support ring and the second support ring.

12. The apparatus of claim 10, wherein the mechanism includes a coil spring wrapped around the fabric cylinder and biased to close the fabric cylinder.

13. The apparatus of claim 10, wherein the mechanism includes a cable wrapped around the fabric cylinder, the cable having one end attached to a constant-force retractor and another end fixed to a clamp, whereby the constant-force retractor can either draw the cable inward and tighten the cable around the fabric cylinder or release the cable and loosen the cable around the fabric cylinder.

14. The apparatus of claim 13, wherein the constant-force retractor and the clamp are located directly opposite each other on either side of the fabric cylinder and the mechanism further includes a first support rod on which the constant-force retractor slides and a second support rod on which the clamp slides, allowing the constant-force retractor and the clamp to follow the motion of the center of the fabric cylinder as the distance between the upper and lower support rings changes.

15. The apparatus of claim 10, further comprising one or any combination of a band, a belt, or a ring located at the approximate center of the fabric cylinder to improve the seal between the object and the fabric cylinder, to protect the fabric cylinder from abrasion by the mechanism, or both.

16. The apparatus of claim 10, further comprising a first clamp ring and a second clamp ring, the first clamp ring attaching the fabric cylinder to the first support ring and the second clamp ring attaching the fabric cylinder to the second support ring.

17. The apparatus of claim 10, wherein the fabric cylinder is made of woven silica, carbon fiber, or aluminosilicate.

18. The apparatus of claim 10 further comprising an enclosure attached to the second support ring, enclosing the fabric cylinder, allowing the first support ring to move within the enclosure, and receiving gas at higher than atmospheric pressure.

19. The apparatus of claim 10 further comprising a controller directing the controlling means for controlling the distance between the first support ring and the second support ring.

20. A process for shielding from contaminants both an object having a circumference and a diameter to be heated in, and a heating element of, a furnace where the object enters or exits the furnace, the process comprising:
providing a variable seal having a first support ring, a second support ring separated from the first support ring by a distance, a fabric cylinder having a center and being attached to the first support ring and to the second support ring, and a mechanism including a coil spring or a cable, the mechanism engaging the approximate center of the fabric cylinder;
locating the variable seal where the object enters or exits the furnace and so that the variable seal surrounds at least a portion of the object;
controlling the distance between the first support ring and the second support ring; and
assuring that the fabric cylinder continuously contacts the circumference of the object regardless of the diameter of the object by moving the first support ring and the second support ring together to enable the mechanism to tighten the fabric cylinder and moving the first support ring and the second support ring apart to enable the mechanism to loosen the fabric cylinder.

* * * * *